United States Patent [19]

Casavant et al.

[11] Patent Number: 5,384,599
[45] Date of Patent: Jan. 24, 1995

[54] TELEVISION IMAGE FORMAT CONVERSION SYSTEM INCLUDING NOISE REDUCTION APPARATUS

[75] Inventors: Scott D. Casavant, East Windsor; Stuart S. Perlman, Princeton, both of N.J.

[73] Assignee: General Electric Company, Schenectady, N.Y.

[21] Appl. No.: 839,651

[22] Filed: Feb. 21, 1992

[51] Int. Cl.⁶ .................. H04N 7/01; H04N 7/04; H04N 11/20
[52] U.S. Cl. .................................. 348/473; 348/470
[58] Field of Search ................... 358/11, 12, 140, 141, 358/36, 37, 167, 166; H04N 7/07, 7/04, 11/20; 348/446, 458, 459, 445, 448, 913, 470, 426, 429, 437, 473

[56] References Cited

U.S. PATENT DOCUMENTS

| | | | |
|---|---|---|---|
| 4,661,850 | 4/1987 | Strolle et al. | 858/140 |
| 4,979,020 | 12/1990 | Isnardi | 358/12 |
| 4,992,873 | 2/1991 | Koslov et al. | 358/167 |
| 5,040,063 | 8/1991 | Citta et al. | 358/141 |
| 5,134,480 | 7/1992 | Wang et al. | 358/140 |
| 5,208,668 | 5/1993 | Dinsel et al. | 358/140 |
| 5,268,751 | 12/1993 | Geiger et al. | 358/12 |

FOREIGN PATENT DOCUMENTS

| | | | |
|---|---|---|---|
| 0212674 | 3/1987 | European Pat. Off. | H04N 5/44 |
| 0510973 | 10/1992 | European Pat. Off. | H04N 7/00 |
| 2213342 | 9/1989 | United Kingdom | H04N 7/08 |

OTHER PUBLICATIONS

Hee-Yong Kim et al., "Digital EDTV", pre-print of paper presented at 133rd SMPTE Technical Conference, Oct. 26-29, 1991.

Ito et al. "A Decoder for Letterbox Type Wide Aspect EDTV System", pre-print of paper presented at 133rd SMPTE Technical Conference, Oct. 26-29, 1991.

Suzuki et al., "Matrix Conversion for Improvement of Vertical-Temporal Resolution in Letterbox Wide Aspect TV", SMPTE Journal, Feb. 1991.

Fukinuki, "Full Utilization of Signals and Transmission Spaces of NTSC TV System", Proceedings of the NAB HDTV World Conference, Las Vegas, Nevada, Apr. 15-18, 1991.

Aikoh et al., "A New System of NTSC-Compatible Wide Aspect Advanced Television-Neew NTSC Mode", Proceedings of the NAB HDTV World Conference, Las Vegas, Nevada, Apr. 15-18, 1991.

Primary Examiner—James J. Groody
Assistant Examiner—Glenton B. Burgess
Attorney, Agent, or Firm—Joseph S. Tripoli; Eric P. Herrmann; Ronald H. Kurdyla

[57] ABSTRACT

A television signal receiver processes a television signal representing a letterbox image display format with a main image region, and a bar region containing auxiliary information to help convert from interlaced to progressive scanning. The auxiliary information is processed in a signal path including a nonlinear amplitude expander and apparatus for modifying the operation of the signal path as a function of the noise content of the television signal.

15 Claims, 4 Drawing Sheets

TELEVISION IMAGE FORMAT CONVERSION SYSTEM INCLUDING NOISE REDUCTION APPARATUS

FIELD OF THE INVENTION

This invention concerns a system for providing a so-called helper signal to facilitate the conversion of a television signal from one image format to another at a receiver. In particular, this invention concerns noise reduction apparatus for processing a helper signal situated in bar regions of a letterbox-type television signal for developing a progressive scan wide aspect ratio image at a receiver.

BACKGROUND OF THE INVENTION

A conventional television receiver, such as a receiver according to NTSC broadcast standards adopted in the United States and elsewhere, displays a line interlaced image with a 4×3 aspect ratio (the ratio of the width to the height of the displayed image). Recently, significant interest has developed concerning the use of enhanced image display formats including wider image aspect ratios, e.g., 16×9 or 5×3, and progressively scanned images.

Two prominent types of compatible widescreen (wide aspect ratio) television signal processing systems are the "side panel" system and the "letterbox" system. In a side panel wide aspect ratio display system, left and right image side panels are spliced to a main image panel to produce a wide aspect ratio image with a 16×9 aspect ratio. One type of NTSC compatible enhanced definition widescreen system is described in U.S. Pat. No. 4,979,020—Isnardi. The letterbox system is commonly used in Europe for television broadcasting of wide aspect ratio movies. In such case a standard 4×3 aspect ratio television receiver receives and displays a vertically cropped image. The vertical cropping causes a displayed image to exhibit a wide aspect ratio such as 16×9, and results in black bars being produced along the top and bottom edges of the displayed image. Although the side panel widescreen format avoids the black bars of the letterbox format, signal processing associated with the side panel format is more complex.

Both the side panel system and the letterbox system may display an image in progressive scan (line sequential) format rather than interlaced scan format to produce what is perceived as a higher resolution display. Often this involves converting an interlaced image signal to a progressive scan image signal with the assistance of a so-called "helper" signal. For example, in the context of a compatible letterbox system, when the original (source) image information is in progressive scan format, a letterbox encoder subsamples the progressive scan image signal to create an NTSC compatible line interlaced signal. The encoder also generates a vertical helper signal prior to subsampling to help convert the compatible letterbox coded interlaced signal back to the original progressive line scan format at a wide aspect ratio progressive scan receiver. The helper signal may be transmitted in the bar regions of the compatible letterbox coded signal. At a wide aspect ratio receiver, the vertical helper signal recovered from the bar regions allows the wide aspect ratio receiver to recover vertical resolution that would otherwise be lost in conversion process from progressive scan to interlaced scan back to progressive scan. The helper signal also helps reduce vertical-temporal aliasing in moving portions of the image.

In order to prevent the bar regions of a wide aspect ratio letterbox image displayed by a standard aspect ratio receiver from distracting a viewer, i.e., to reduce the visibility of the helper signal, the helper signal may be attenuated and shifted in a black image direction at the encoder to assure that the bar region appears black when displayed, for most if not all images. At a wide aspect ratio receiver the helper signal is amplified in the amount of the attenuation factor before being utilized. Techniques for developing helper signals to facilitate the conversion of an original progressive scan signal to an interlaced signal and back to the original progressive scan form are well known. For example, one such technique in the context of a side panel widescreen television system is described in U.S. Pat. No. 4,979,020—Isnardi. Suzuki et al. disclose the use of a vertical-temporal helper signal for interlaced to progressive scan conversion in the context of a letterbox television system, in "Matix Conversion for Improvement of Vertical-Temporal Resolution in Letterbox Wide-Aspect TV", SMPTE Journal, February 1991.

It is herein recognized that transmission channel noise can degrade the helper signal sufficiently to adversely affect the quality of an image displayed at a receiver. This is particularly likely to occur, for example, when the helper signal and the main image signal are subjected to different types of signal processing. In the case of a letterbox system, it is recognized that channel noise is likely to adversely affect a helper signal that is companded in the bar regions of a compatible letterbox television signal. A system according to the present invention decreases the effects of noise in a decoded widescreen image due to noise corruption of the helper signal.

SUMMARY OF THE INVENTION

In a system employing apparatus according to the principles of the present invention, a received television signal contains a first component representing an image to be displayed, and a second component with information to help construct an image with a desired display scanning format. The first and second components are combined after processing in respective processing paths. The second component processing path includes means for amplitude expanding the second component, and means for modifying the operation of the second path as a function of the noise content of the received television signal.

In illustrated embodiments the received television signal is in letterbox format with a main image region, and upper and lower bar regions containing the second component in amplitude compressed form. The path for processing the second component contains amplitude expansion apparatus together with selected combinations of noise responsive clipping and attenuating networks.

DETAILED DESCRIPTION

Figure 1:
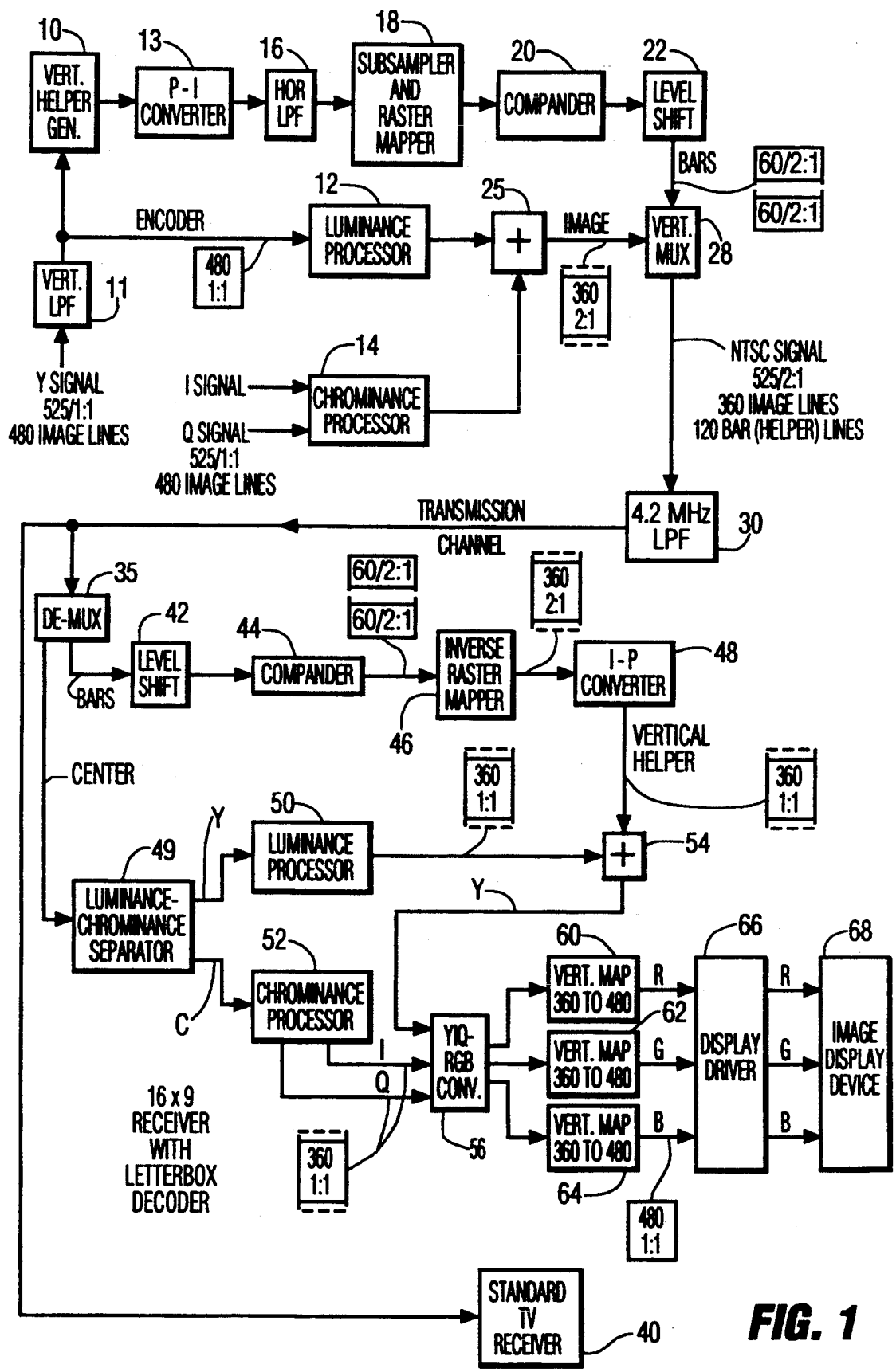
FIG. 1 shows a letterbox encoding/decoding system including apparatus according to the present invention.

In the transmitter/encoder portion of the system shown in FIG. 1, a luminance component of an NTSC compatible color television signal is applied via a vertical low pass filter 11 to a unit 10 for generating a vertical helper signal, and to a luminance processor 12. Filter 11 prevents aliasing when the input luminance signal is later subsampled from 480 to 240 lines to create interlaced scanning lines. The luminance signal is a 525 line, progressive line scan (1:1) signal with 480 image lines and a 4×3 aspect ratio. Chrominance components I and Q exhibit the same format as the luminance component, and are applied to a chrominance processor 14 via vertical filters (not shown) similar to filter 11. The luminance and chrominance components have been protected to 360 image lines so that a 360 image line letterbox formatted signal can be developed for display by a standard television receiver. Helper signal generator 10 may include a vertical high pass filter for filtering the central 360 horizontal image lines of the luminance signal before it is subsampled by a progressive to interlaced scan converter 13 to produce an interlaced line signal. In this example, the vertical high pass filter is a 3-tap device with tap weights of $-0.5$, $1.0$, $-0.5$. A line difference vertical helper signal produced by unit 10 contains the difference between data to be discarded by the subsampling process and an estimate obtained from data that is transmitted. The helper signal is a low energy signal since in most cases this difference will be small. A simple helper signal (H) can be defined as $[(a+c)/2]-b$, where a, b and c are three vertically aligned pixels on three adjacent lines of a progressive scan signal. At a receiver, pixels a and c are recovered together with helper signal H. Pixel b can be recovered by subtracting the helper signal from the average of pixels a and c, i.e., $[(a+c)/2]-H$.

In this example the helper signal is mapped into the upper and lower bar regions of a letterbox signal, which together consume about 25% of the active image region height (120 image lines out of 480 image lines). Thus three helper signal lines are mapped into one bar line. This is accomplished by a unit 18 which horizontally subsamples (data compresses) the signal from unit 16 by a factor 3:1, followed by a "cut and paste" mapping process which moves the horizontally compressed helper signal information into the bar regions. Since three full screen width vertical helper signal lines are horizontally subsampled and mapped into one bar line by means of unit 18, to prevent aliasing the helper signal is low pass filtered by a 1.4 MHz horizontal LPF 16 prior to subsampling and mapping. A 1.4 MHz cut-off frequency was chosen because the signal must eventually pass through a 4.2 MHz NTSC channel filter 30 before being transmitted (4.2 MHz÷3 = 1.4 MHz).

Since the helper signal information in the bar region exhibit a nominal gray level, the signal provided by unit 18 can be distracting to a viewer when displayed by a standard 4×3 aspect ratio receiver. An amplitude compander 20, as will be discussed in greater detail subsequently, reduces the visibility of helper signal information in the bar regions by making these regions less visible when displayed. In addition, a level shifting unit 22 shifts the average level of the bars signal from gray to black. Amplitude compression produced by compander 20 and level shifting produced by unit 22 result in the helper signal being substantially unnoticeable in the bar regions for most images. At this point the bars signal comprises an interlaced (2:1) 60 line upper bar component, and an interlaced 60 line lower bar component.

Luminance processor 12 and chrominance processor 14 process the central 360 image lines of the input signal. Luminance processor 12 includes apparatus for converting the input image signal from progressive to interlaced format, followed by apparatus for vertically cropping from 480 to 360 image lines. In chrominance processor 14, the I and Q chrominance components are processed via separate paths (not shown) each including an input vertical low pass filter (133 cycles/picture height), a progressive to interlaced scan converter, and a vertical cropping network (480 to 360 central image lines). The I and Q components are respectively filtered by 1.4 MHz and 0.5 MHz horizontal low pass filters before being applied to a chrominance modulator. Processed luminance and chrominance output signals from units 12 and 14 exhibit standard NTSC interlaced form with 360 image lines, and are combined by an adder 25.

An output central image signal from adder 25 and the bars signal from unit 22 are vertically multiplexed by a multiplexer (MUX) 28, which combines the interlaced central image signal and the bars signal containing the vertical helper information. A resulting NTSC compatible image signal at the output of multiplexer 28 contains 60 bar lines encoded with helper signal information along the top and bottom edges of the image (a total of 120 helper lines). The central 360 image lines represent a 16×9 aspect ratio cropped version of the original 480 line image.

The letterbox coded NTSC compatible signal from multiplexer 28 is conveyed via a transmission channel, e.g., broadcast or cable, to a standard NTSC television receiver 40 where a 4×3 display screen displays a 16×9 image bordered with upper and lower bar regions. The letterbox coded signal is also conveyed to a 16×9 wide aspect ratio receiver including a letterbox decoder. In the 16×9 receiver the received composite television signal is applied to a de-multiplexer (DE-MUX) 35 for separating the received television signal into a central image component and a bars component. The bars component is applied to a level shifter 42 in a helper signal recovery channel, which shifts the average level of the bars signal component back to its original gray level. A compander 44 expands the amplitude of the bars signal by the amount that the amplitude was compressed by unit 20 at the encoder, whereby the original dynamic range of the helper signal information is restored. A unit 46 performs inverse raster mapping of the bars signal. Specifically, unit 46 performs the inverse of the raster mapping operation performed by unit 18 at the encoder, using "cut and paste" processing to move the 3:1 data compressed helper signal information from the bar regions into the original vertical position in the image. Unit 46 includes an 8-point interpolator to expand the helper signal information horizontally by a factor of three to achieve full screen line width. At this point a reconstructed 360 line, full screen width, interlaced helper signal is produced. A unit 48 converts the reconstructed interlaced helper signal to progressive scan form so that it can be added to a 360 line progressive scan central image luminance component.

The center image component from DE-MUX 35, containing the central 360 image lines, is processed by a luminance-chrominance separator 49 (e.g., a comb filter) which provides a separated luminance component Y and a separated chrominance component C at respective outputs. Units 50 and 52 selectively process the luminance and chrominance components. Luminance processor 50 converts the 360 horizontal line luminance image signal from interlaced to progressive scan format. In converting from interlace to progressive scan, missing lines are reconstructed by taking the vertical average of the lines above and below the line being reconstructed. The progressive scan vertical helper signal from unit 48 contains the difference between the data that was discarded in the progressive scan to interlaced conversion at the encoder and the data that was transmitted, and is added to alternate image lines of the progressive scan central image signal from unit 50, via a combiner 54, to recover the luminance image information. The helper signal thus permits recovery of information that would have otherwise been lost in the progressive-interlaced-progressive scan conversion cycle. Chrominance processor 52 includes an I, Q demodulator for recovering the separate I and Q components, and apparatus for converting the I and Q components from interlaced to progressive scan format.

Luminance component Y from combiner 54 and chrominance components I, Q from processor 52 exhibit a similar 360 line central image, 1:1 progressive scan format, and are converted to R, G, B color image representative signals by means of a converter 56, e.g., a matrix network. Vertical raster mappers 60, 62 and 64 include interpolators for vertically expanding the reconstructed 360 line R, G, B image signals to full 480 image line display screen height. The R, G, B signals from units 60, 62 and 64 are each a 525 line, progressive scan, 480 image line signal, and are applied via a display driver 66 to an image display device 68 (e.g., a color kinescope).

The following discussion addresses the use of apparatus to reduce the effects of noise in the helper signal recovery path. It has been observed that the low energy difference type vertical helper signal magnitude is usually in the vicinity of zero, and typically occupies +10% of the full NTSC luminance range (−40 to 120 IRE), even for special images containing large amounts of vertical detail. Companders 20 and 44 at the encoder and decoder exhibit complementary non-linear μ-law companding characteristics. Compander 20 at the encoder amplitude compresses the helper signal with a relatively linear, low compression factor (e.g., less than four, or preferably unity) in the vicinity of zero amplitude where most of the helper signal information is expected. Low compression in this region enables signal values to be reconstructed accurately without significantly increasing the noise. The small amount of helper signal falling outside this region is subject to heavier, non-linear compression. Compander 44 at the decoder exhibits an inverse (expansion) characteristic.

Since most of the helper signal's dynamic range is subjected to little or no compression, associated noise in this region of the helper signal is subjected to little or no enhancement when the helper signal amplitude is expanded at a receiver decoder. However, any large amplitude excursions of the helper signal are subjected to significant nonlinear compression, e.g., by a factor greater than four. Thus any noise which is associated with large amplitude excursions of the helper signal, or which is itself large enough to significantly increase the magnitude of a small helper signal, is greatly amplified when such amplitude excursions are expanded at a receiver decoder. Such amplified noise undesirably appears in a decoded image as a noticeably bright or dark spot approximately three pixels wide resulting from the 1:3 horizontal expansion in unit 46. Thus although the nonlinear compander renders most of the helper signal less sensitive to noise, noise sensitivity may be increased under certain conditions as described. The companding system does not address the fact that noise is expanded horizontally by a factor of three due to decoder processing. The companding system affects only the dynamic range (amplitude) of noise in a displayed image.

The undesirable noise effects mentioned above are addressed by the decoder arrangements shown in FIGS. 2–4 and 8. The apparatus of FIG. 2 differs from the apparatus in the helper signal recovery path of FIG. 1 in that a noise responsive variable amplitude attenuator 70 follows compander 44. The gain of attenuator 70 is a function of the noise content of the received signal such that attenuator 70 exhibits substantially unity gain in response to a substantially noise-free input signal, and progressively smaller gain as input signal noise increases. Therefore in noisy conditions only a fraction of the helper signal is added to the image signal. The fraction of helper signal added is predetermined such that the amount of noise present in a displayed image is not expected to be objectionable. Attenuating the helper signal in this fashion is acceptable since any amount of helper signal will help reconstruct a progressive scan image signal with varying degrees of accuracy, and will generally produce a better result than not using a helper signal. Thus when the helper signal is corrupted by noise, whereby the reconstructed image is likely to contain objectionable bright/dark spots as explained, the amount of helper signal added to the image signal is reduced as determined by the amount of noise present. Attenuator 70 may be located between the output of compander 44 and the point at which the helper signal is added to the central image signal, i.e., prior to combiner 54 in FIG. 1.

Figure 2:
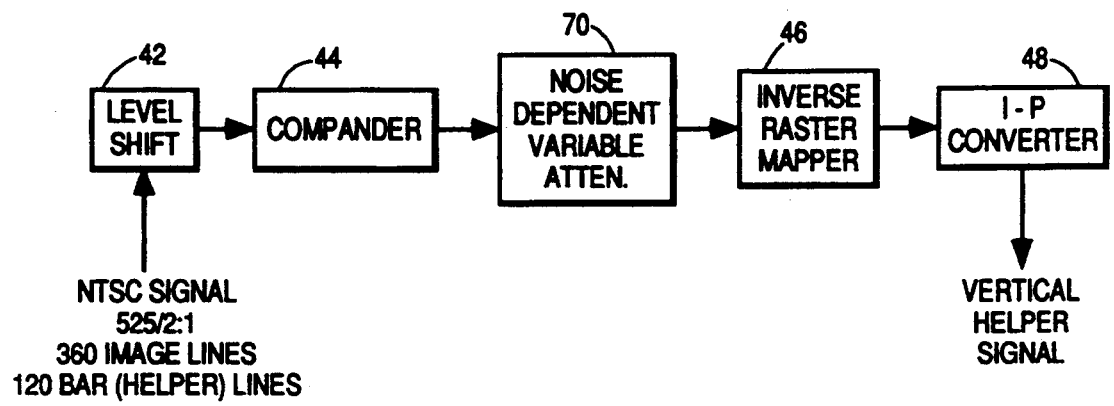
FIGS. 2–4 and 8 depict alternative arrangements of decoding apparatus according to the present invention.
Figure 3:
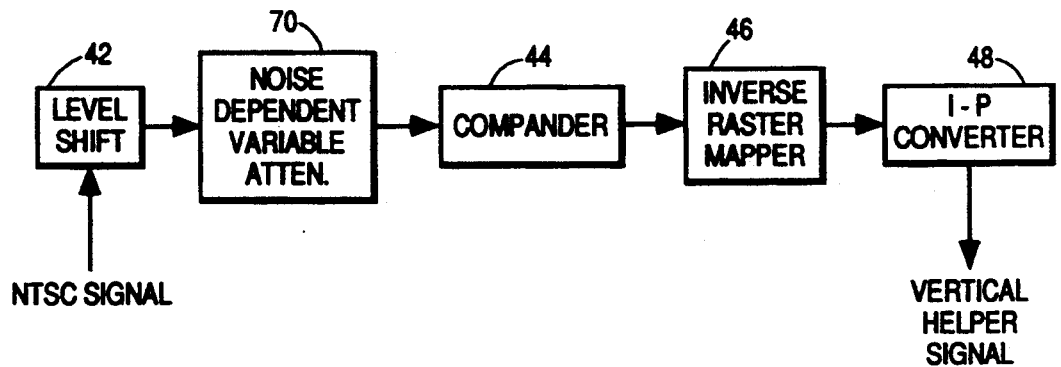

FIG. 3 depicts a modification of the decoder apparatus shown in FIG. 2 wherein the positions of compander 44 and attenuator 70 have been interchanged to further reduce the effects of noise. In the case of FIG. 2, a noisy input signal may have a large amplitude excursion causing compander 44 to amplify such excursion nonlinearly with a high gain (e.g., four or greater), before being attenuated by unit 70. In such case it is likely that significant noise will remain in the attenuated signal. In contrast, in the FIG. 2 arrangement a similar noisy input signal with a large amplitude excursion may be sufficiently attenuated by unit 70 to reduce such amplitude excursion below the threshold at which compander 44 begins to amplify signals nonlinearly with a high gain. In this case an output signal from compander 44 will have been amplitude expanded by a more linear, lesser amount (e.g., less than four, or preferably unity) and will be less corrupted by noise.

Figure 4:
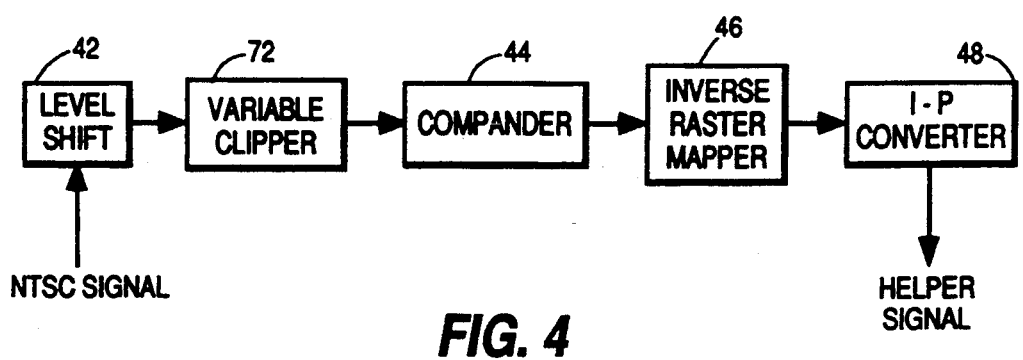

The noise reduction arrangements of FIGS. 2 and 3 reduce the amplitude of the entire helper signal. However, in moderately noisy images, only noise associated with amplitude excursions within the nonlinear, large amplification operating region of compander 44 produces highly objectionable effects. The arrangement of FIG. 4 addresses this matter by placing a noise responsive variable amplitude clipper 72 before compander 44. FIG. 4 differs from FIG. 3 in that attenuator 70 in FIG. 3 has been replaced by clipper 72 in FIG. 4. Clipper 72 passes a predetermined range of helper signal amplitude excursions without alteration to compander 44. Helper signal amplitude values exceeding a threshold value are made equal to, i.e., are clipped to, the threshold value.

Figure 5:
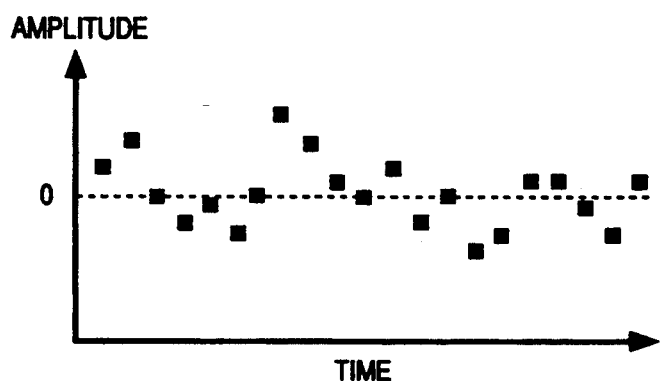
FIGS. 5–7 illustrate helper signal amplitude versus time characteristics to assist in understanding the operation of the invention.
Figure 6:
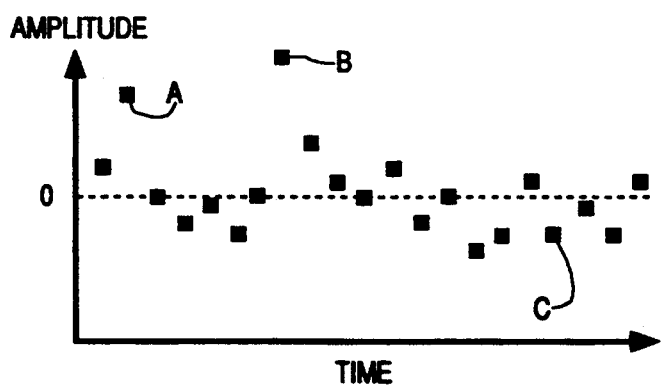

The operation of the apparatus of FIG. 4 will be explained with reference to FIGS. 5-7. FIG. 5 shows an amplitude versus time characteristic of an illustrative original compressed helper signal prior to transmission, with positive and negative amplitude pixel values illustrated with respect to a nominal zero amplitude level. FIG. 6 shows the same helper signal after channel noise has been added. Points A and B designate increased amplitude helper signal pixels that have been corrupted by noise so as to normally produce an offensive bright spot in a displayed image. In this case the compander expansion function at the receiver would apply a large gain factor to an already large helper signal including noise, thereby accentuating the noise. Point C designates a noise corrupted pixel value that would not produce an objectionable change in a displayed image, since values near zero are not highly amplitude compressed by the compander unit at the transmitter/encoder, and therefore are not subjected to complementary large amplification by the compander unit at the receiver/decoder. The use of clipper 72 recognizes that since the helper signal normally does not exhibit a large magnitude, it is acceptable to limit sporadically occurring large helper signal amplitude excursions before they reach compander 44 at the decoder.

Figure 7:
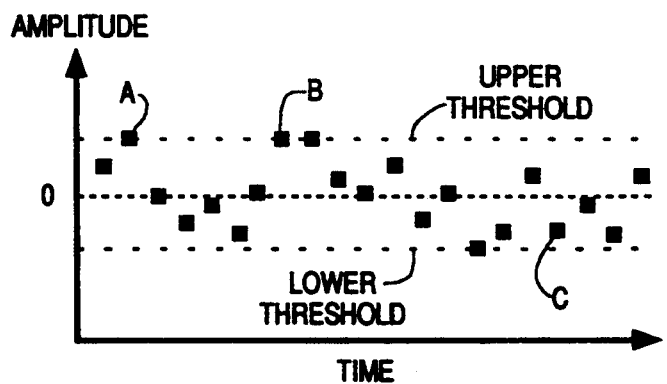

FIG. 7 illustrates a noisy helper signal after being clipped by unit 72 in FIG. 4. Pixels A and B are clipped to the upper clipper threshold, whereas pixel C remains unchanged since its value does not exceed either the upper or lower clipping threshold. In this example Corrupted helper pixel A is restored to its original amplitude value at the output of clipper 72 (compare FIG. 6), while corrupted pixel B is decreased in amplitude to a level lower than it exhibited before the addition of noise. After amplitude expansion by compander 44, a weaker helper signal is produced compared to that which would result in a noise-free case. It has been observed, however, that in a noisy environment a weak helper signal is preferred over a very strong helper signal because a weak helper signal does not produce objectionable bright spots in a displayed image. The fact that clipping action does not affect corrupted helper pixel C is acceptable since corrupted pixel C does not produce a noise induced bright artifact in a displayed image.

The amount of clipping produced by clipper 72 varies as a function of the amount of noise in the helper signal. Clipper 72 passes the helper signal unaltered in the presence of a noise free signal. Increasing signal noise causes the clipper threshold to vary so as to limit the amplitude and dynamic range of the helper signal to a greater degree. The use of an amplitude clipper is preferred over a variable attenuator since with a clipper most of the helper signal is passed unaltered. Helper signal amplitude values usually do not fall in the clipping region, but those values which do are typically noise sensitive. Thus the variable clipper selectively attenuates only portions of the helper signal that are likely to produce unwanted noise induced artifacts in a displayed image.

Figure 8:
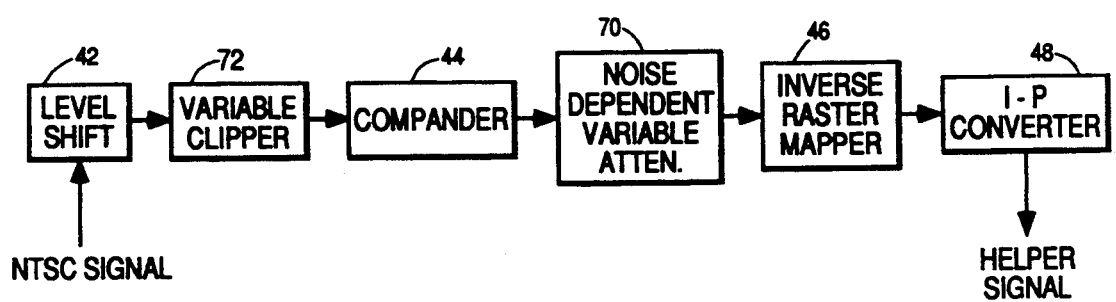

FIG. 8 depicts further noise reduction apparatus wherein compander 44 is preceded by noise responsive variable clipper 72 and followed by noise responsive variable attenuator 70. Clipper 72 prevents large helper signal amplitude excursions from reaching comparator 44 as discussed, and attenuator 70 decreases the amplitude of an output helper signal from compander 44. While the latter unit attenuates the helper signal to some degree, this may be desirable in some cases to further reduce the effects of noise.

Variable attenuator 70 (FIGS. 2, 3 and 8) and variable clipper 72 (FIGS. 4 and 8) can be made to operate as a function of noise level by employing well-known techniques. For example, attenuator 70 may include a keyed network for sampling the high frequency content of the luminance signal during a "quiet" portion of the vertical blanking interval to detect the presence of noise, a filter to develop a control voltage as a function of the magnitude of the noise-representative sampled output, and a gain control input responsive to the control voltage for adjusting the amount of attenuation as a function of the magnitude of the control voltage. A similar technique could be used for clipper 72.

What is claimed is:

1. In a system for receiving a television signal including a first signal component representing an image to be displayed, and a second signal component containing auxiliary information to help construct said image with a desired display scanning format, said receiving system including an image signal processing path responsive to said television signal for processing said first component;

an auxiliary signal processing path for processing said second component;

means for combining output signals from said main and auxiliary paths for providing an output image signal; wherein said auxiliary path includes means for amplitude expanding said second component in accordance with a predetermined expansion characteristic; and means for modifying the operation of said auxiliary path as a function of the noise content of said television signal said noise content being distinct from said auxiliary information.

2. A system according to claim 1, wherein said auxiliary path includes means for converting signals processed by said auxiliary path to a progressive line scanning format.

3. A system according to claim 1, wherein said auxiliary information is vertical line difference information; and said expansion characteristic is nonlinear.

4. In a system for receiving a television signal including a first signal component representing an image to be displayed, and a second signal component containing auxiliary information to help construct said image with a desired display scanning format, said receiving system including an image signal processing path responsive to said television signal for processing said first signal component;

an auxiliary signal processing path for processing said second signal component, said auxiliary path including means for amplitude expanding said second signal component in accordance with a predetermined expansion characteristic; and means for modifying the operation of said auxiliary path as a function of the noise content of said television signal; and means for combining output signals from said main and auxiliary paths for providing an output image signal; wherein said modifying means comprises amplitude attenuating means exhibiting a variable attenuating characteristic as a function of said noise content.

5. In a system for receiving a television signal including a first signal component representing an image to be displayed, and a second signal component containing auxiliary information to help construct said image with a desired display scanning format, said receiving system including an image signal processing path responsive to said television signal for processing said first signal component;

an auxiliary signal processing path for processing said second signal component, said auxiliary path including means for amplitude expanding said second signal component in accordance with a predetermined expansion characteristic, and means for modifying the operation of said auxiliary path as a function of the noise content of said television signal; and means for combining output signals from said main and auxiliary oaths for providing an output image signal; wherein said modifying means comprises amplitude clipping means exhibiting a variable clipping characteristic as a function of said noise content.

6. A system according to claim 5, wherein
said clipping means precedes said expanding means in said auxiliary path.

7. In a system for receiving a television signal including a first signal component representing an image to be displayed, and a second signal component containing auxiliary information to help construct said image with a desired display scanning format, said receiving system including an image signal processing path responsive to said television signal for processing said first signal component;

an auxiliary signal processing path for processing said second signal component, said auxiliary path including means for amplitude expanding said second signal component in accordance with a predetermined expansion characteristic, and means for modifying the operation of said auxiliary path as a function of the noise content of said television signal; and means for combining output signals from said main and auxiliary paths for providing an output image signal; wherein said modifying means includes amplitude clipping means, preceding said expanding means, exhibiting a variable clipping characteristic as a function of said noise content; and amplitude attenuating means, following said expanding means, exhibiting a variable attenuating characteristic as a function of said noise content.

8. In combination with a system for generating a television signal representing a letterbox image display format having a main image region and a bar region containing auxiliary information to help construct an image with a desired display scanning format, a television signal receiver including a main image signal processing path responsive to said television signal for processing information representing said main image region;

an auxiliary signal processing path for processing information contained in said bar region; and means for combining output signals from said main and auxiliary paths for providing an output image signal; wherein said auxiliary path includes means for amplitude expanding said auxiliary information in accordance with a predetermined expansion characteristic; and means for modifying the operation of said auxiliary path as a function of the noise content of said television signal said noise content being distinct from said auxiliary information.

9. In a system for receiving a television signal representing a letterbox image display format having a main image region and a bar region containing auxiliary information to help construct an image with a desired display scanning format, said receiving system including a main image signal processing path responsive to said television signal for processing information representing said main image region;

an auxiliary signal-processing path for processing auxiliary information contained in said bar region; and means for combining output signals from said main and auxiliary paths for providing an output image signal; wherein said auxiliary path includes means for amplitude expanding said auxiliary information in accordance with a predetermined expansion characteristic; and means for modifying the operation of said auxiliary path as a function of the noise content of said television signal said noise content being distinct from said auxiliary information.

10. A system according to claim 9, wherein said system further includes means for mapping information from said auxiliary signal bar region to said main image region; and means for converting an output signal from said mapping means to a progressive image scanning format.

11. A system according to claim 9, wherein
said auxiliary information is vertical line difference information; and said expansion characteristic is nonlinear.

12. In a system for receiving a television signal representing a letterbox image display format having a main image region and a bar region containing auxiliary information to help construct an image with a desired display scanning format, said receiving system including a main image signal processing path responsive to said television signal for processing information representing said main image region;

an auxiliary signal processing path for processing said auxiliary information contained in said bar region, said auxiliary path including means for amplitude expanding said auxiliary information in accordance with a predetermined expansion characteristic, and means for modifying the operation of said auxiliary path as a function of the noise content of said television signal; and means for combining output signals from said main and auxiliary paths for providing an output image signal; wherein said modifying means comprises amplitude attenuating means exhibiting a variable attenuating characteristic as a function of said noise content.

13. In a system for receiving a television signal representing a letterbox image display format having a main image region and a bar region containing auxiliary information to help construct an image with a desired display scanning format, said receiving system including a main image signal processing path responsive to said television signal for processing information representing said main image region;

an auxiliary signal processing path for processing said auxiliary information contained in said bar region, said auxiliary path including means for amplitude expanding said auxiliary information in accordance with a predetermined expansion characteristic; and means for modifying the operation of said auxiliary path as a function of the noise content of said television signal, and means for combining output signals from said main and auxiliary paths for providing an output image signal; wherein said modifying means comprises amplitude clipping means exhibiting a variable clipping characteristic as a function of said noise content.

14. A system according to claim 13, wherein said clipping means precedes said expanding means in said auxiliary path.

15. In a system for receiving a television signal representing a letterbox image display format having a main image region and a bar region containing auxiliary information to help construct an image with a desired display scanning format, said receiving system including a main image signal processing path responsive to said television signal for processing information representing said main image region;

an auxiliary signal processing path for processing said auxiliary information contained in said bar region, said auxiliary path including means for amplitude expanding said auxiliary information in accordance with a predetermined expansion characteristic; and means for modifying the operation of said auxiliary path as a function of the noise content of said television signal, and means for combining output signals from said main and auxiliary paths for providing an output image signal;

wherein said modifying means includes amplitude clipping means, preceding said expanding means, exhibiting a variable clipping characteristic as a function of said noise content; and amplitude attenuating means, following said expanding means, exhibiting a variable attenuating characteristic as a function of said noise content.

* * * * *